US009656648B2

(12) United States Patent
Schubert et al.

(10) Patent No.: US 9,656,648 B2
(45) Date of Patent: May 23, 2017

(54) DISK BRAKE SYSTEM

(71) Applicant: SIEMAG Tecberg GmbH, Haiger (DE)

(72) Inventors: Wolfgang Schubert, Haiger (DE); Klaus Hofmann, Haiger (DE)

(73) Assignee: SIEMAG Tecberg GmbH, Haiger (DE)

( * ) Notice: Subject to any disclaimer, the term of this patent is extended or adjusted under 35 U.S.C. 154(b) by 0 days.

(21) Appl. No.: 14/405,618

(22) PCT Filed: Jun. 7, 2013

(86) PCT No.: PCT/EP2013/061830
§ 371 (c)(1),
(2) Date: Dec. 4, 2014

(87) PCT Pub. No.: WO2013/182691
PCT Pub. Date: Dec. 12, 2013

(65) Prior Publication Data
US 2015/0123458 A1    May 7, 2015

(30) Foreign Application Priority Data
Jun. 8, 2012   (DE) ........................ 10 2012 011 539

(51) Int. Cl.
| *B66B 1/24* | (2006.01) |
| *B66B 1/18* | (2006.01) |
| *B60T 13/66* | (2006.01) |
| *B66D 5/26* | (2006.01) |
| *B60T 11/24* | (2006.01) |
| *B60T 13/14* | (2006.01) |
| *B60T 13/68* | (2006.01) |
| *F16D 55/225* | (2006.01) |

(52) U.S. Cl.
CPC ............. *B60T 13/662* (2013.01); *B60T 11/24* (2013.01); *B60T 13/14* (2013.01); *B60T 13/141* (2013.01); *B60T 13/686* (2013.01); *B66D 5/26* (2013.01); *F16D 55/225* (2013.01)

(58) Field of Classification Search
CPC ........... B65D 5/28; B66B 1/32; B66B 1/2433; B66D 5/14; F16D 55/2245
USPC .......... 187/288, 382; 188/181 R, 181 T, 182, 188/184, 74, 78, 79, 186, 187
See application file for complete search history.

(56) References Cited

U.S. PATENT DOCUMENTS

| 4,696,377 A * | 9/1987 | Richardson .............. B66D 5/14 |
| | | 188/151 R |
| 6,394,234 B1 * | 5/2002 | Gao .................... F16D 55/2245 |
| | | 188/151 A |
| 7,201,366 B2 | 4/2007 | Sanders et al. |
| (Continued) | | |

FOREIGN PATENT DOCUMENTS

| CN | 2390857 Y | 8/2000 |
| CN | 101865184 A | 10/2010 |
| (Continued) | | |

*Primary Examiner* — Christopher Schwartz
(74) *Attorney, Agent, or Firm* — 24IP Law Group; Timothy R DeWitt

(57) ABSTRACT

The invention relates to a disk brake system for hoisting machines and winches, equipped with at least two brake circuits, wherein to each brake circuit at least one brake caliper with associated brake pads is allocated, and wherein two redundant, active control circuits (10, 12, 14, 16) are provided per brake circuit.

18 Claims, 1 Drawing Sheet

(56) References Cited

U.S. PATENT DOCUMENTS

| | | | |
|---|---|---|---|
| 2004/0251088 A1* | 12/2004 | Ferrand | B66D 5/30 187/350 |
| 2006/0049005 A1* | 3/2006 | Hendrich | F16D 65/18 188/71.5 |
| 2006/0184306 A1* | 8/2006 | Kolberg | B60T 8/1703 701/70 |
| 2008/0006485 A1* | 1/2008 | Kocher | B66B 1/2433 187/382 |
| 2009/0079259 A1* | 3/2009 | Iwasaki | B60T 1/10 303/146 |
| 2010/0237306 A1* | 9/2010 | Eschelbacher | B66D 1/12 254/362 |
| 2011/0168502 A1* | 7/2011 | Linhoff | B60T 13/588 188/72.2 |
| 2011/0278099 A1* | 11/2011 | Kattainen | B66B 1/32 187/288 |
| 2012/0073909 A1* | 3/2012 | Kondo | B66B 5/02 187/247 |
| 2012/0319632 A1* | 12/2012 | Lipp | H02H 7/093 318/400.21 |
| 2015/0053507 A1* | 2/2015 | Kattainen | B66B 1/32 187/288 |

FOREIGN PATENT DOCUMENTS

| | | |
|---|---|---|
| CN | 102459049 A | 5/2012 |
| DE | 12 68 342 B | 5/1968 |
| DE | 32 04 695 C2 | 8/1983 |
| DE | 10 2007 041 411 B3 | 1/2009 |
| DE | 10 2008 056 022 B3 | 3/2010 |
| DE | 02 2012 101654 U1 | 7/2012 |
| DE | 20 2012 101654 U1 | 7/2012 |
| JP | 2011168384 A | 9/2011 |

* cited by examiner

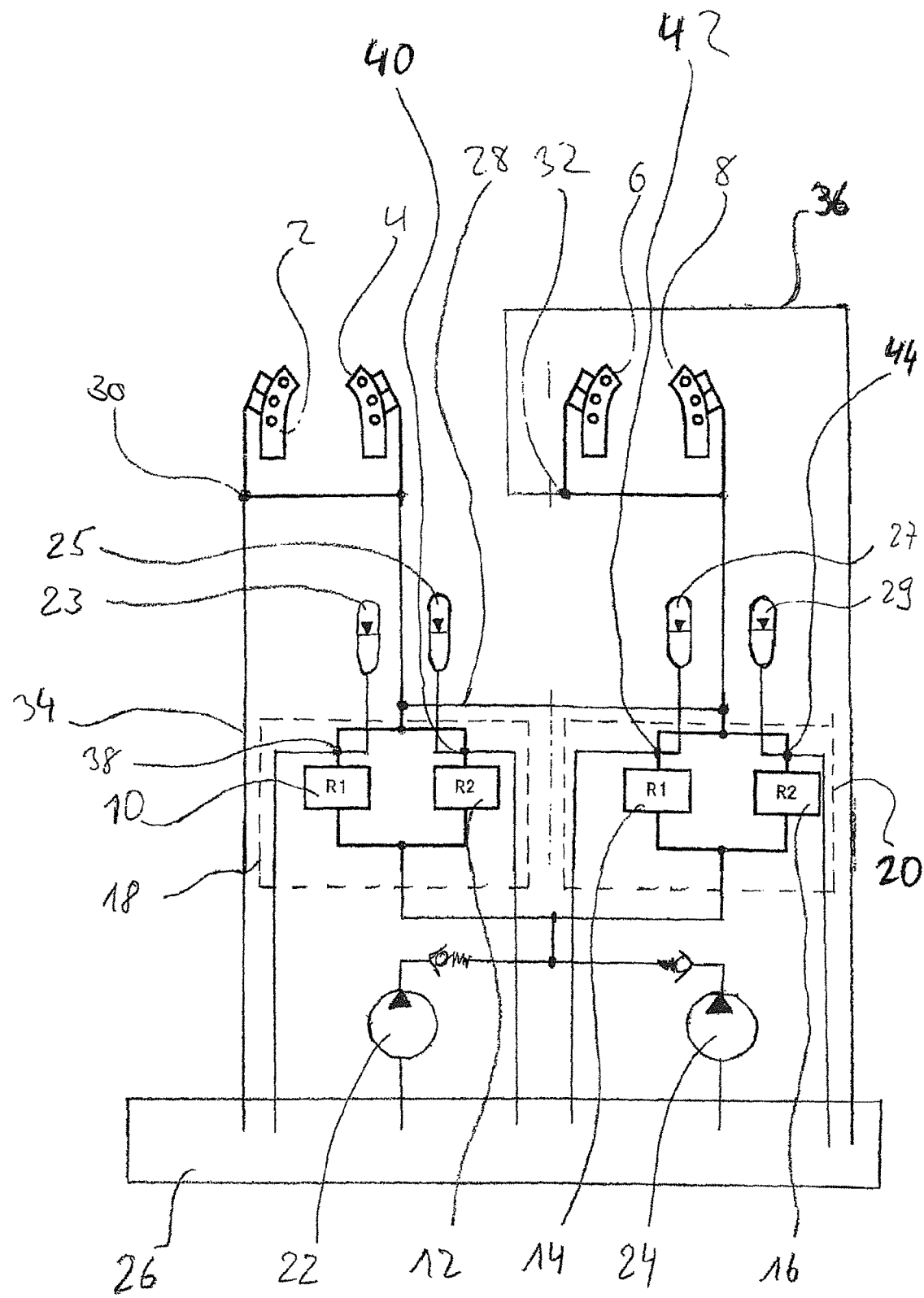

DISK BRAKE SYSTEM

The present invention relates to disk brake systems for hoisting machines and winches, having a hydraulic aggregate and associated control, as described by the preamble of the independent patent claim.

There exist various type-approved disk brake systems consisting of a hydraulic aggregate and associated control. Such a brake has a brake stand that is adjusted to the hoisting machine and as a rule is equipped with likewise type-approved brake elements. The braking force is generated by pre-tensioned springs and lifted hydraulically, wherein the air gap is easy to readjust.

The associated electrical brake control with electronic regulation is a self-contained system, independent of other controls of the hoisting installation.

The components coordinated with the hoisting machine or winch in question guarantee safe braking in the system, both during normal operation and upon safety braking. The braking force is initiated in a controlled fashion in order to preserve the hoisting apparatus and to prevent rope slippage in Koepe hoisting installations.

It has also been known so far to brake one braking circuit or one brake disk in each case using two separate, active brake aggregates, however with controlled brakes which, upon a disturbance of the control, switch to a "constant braking force" which is built up and maintained by a reservoir with a defined residual pressure.

The deceleration of the installation upon failure of the control is thus dependent on the direction of load, etc. and is no longer constant, and can possibly, dependent upon the specific installation, lead to rope slippage in Koepe machines.

Also two- or multichannel braking systems without redundancy in the individual channels are known.

In order to avoid these problems, in one version a brake was suggested having two redundant control circuits for all brake stands/brake elements of a system, which so adjusts the pressure upon safety braking that the machine comes to a standstill with a predetermined deceleration (e.g. 1.5 m/s$^2$), independently of the operational status of the system, i.e. payload upward, hoisting means empty or payload downward. If one control circuit fails, the second control circuit automatically assumes the control function, meaning that the brake continues to be controlled.

Due to some accidents in this area, in particular in view of the braking systems, there is a need to further develop this type of systems, in order to rule out accidents to the highest possible extent from the start, to safeguard man and machine, wherein the systems must be as simple as possible to realize, to maintain and to operate.

This object is achieved by a system having the features of the independent patent claim 1, wherein the features of the sub-claims describe expedient embodiments.

A disk brake system is provided for hoisting machines and winches, equipped with at least two brake circuits, wherein to each break circuit at least one brake caliper including the brake pads are allocated, wherein per brake circuit of the system two redundant, active control circuits are provided, which, upon safety braking, ensure a constant deceleration of the system even if one control circuit fails. With such an arrangement the safety of the disk brake system is again increased in comparison to the known systems, since each individual brake circuit can stop the machine on its own. Preferably, respectively one half of the brake calipers is allocated to each brake circuit.

In a preferred embodiment it is provided that the respective control circuits of a brake circuit are combined in a compact control unit, including the pressure reservoirs and the associated monitoring and control electronics. The pressure reservoirs can also be used in normal operation as a support means for lifting the brake, so that the use of smaller pumps is possible. To generate pressure, at least one pump is provided for all brake circuits. However, for reasons of availability, also two redundant pumps (22, 24) can be installed, wherein the one pump runs and the second pump can be used as a support means temporarily as standby for the quick lifting of the brake elements and/or filling the reservoirs.

Upon safety braking, the pumps are disconnected from the current supply or turned off, in order not to be able to generate any more pressure. The control circuits regulate the pressure downwards and apply the brake elements until the predetermined constant deceleration has been reached. When the pressure in the system is too low, the pressure is increased again by the respective pressure reservoirs (23, 24, 27, 29).

It is likewise preferred to provide all control units, reservoirs, pump units, monitoring components, etc. combining the control circuits on one tank as a compact aggregate.

As an alternative to the compact aggregate, one individual aggregate is possible per brake circuit, having a tank, control units, reservoirs, pressure supply, monitoring, etc.

It is further preferred that the control circuits and/or the control units of the respective brake circuits can be mutually coupled, preferably by a combination of locking devices, so that upon failure of the control unit in one brake circuit the system can continue to be operated only with the control units of the other brake circuit. In this case one brake circuit operates all brake calipers.

It is further preferred to additionally provide on each brake circuit oil-release valve units, possibly in combination with pressure limiting valves, for the stepwise application of the brake calipers on the brake disks, at full braking force or partial braking force via pressure limiting valves in the line to the tank, possibly as a backup system, wherein the brake elements (2, 4, 6, 8) can be allocated to the brake circuits as desired.

Further characteristics, features and advantages of the present invention can be gathered from the following, purely illustrative and non-limiting description of a preferred embodiment of a disk brake system according to the present invention with reference to the enclosed drawings, where there is shown:

FIG. 1 a schematic representation of the preferred embodiment of the disk brake system for two brake circuits of a hoisting machine or winch;

In FIG. 1 the schematic representation of a preferred embodiment of the disk brake system is shown for two brake circuits of a hoisting machine, or of a winch. Therein the schematic brake calipers 2 and 4 of a first brake circuit, as well as the schematic brake calipers 6 and 8 of a second brake circuit of the hoisting machine or winch can be recognized. As can be recognized, the brake calipers 2, 4, 6 and 8 are respectively equipped with three brake calipers represented as circles, wherein also any other number of brake calipers per brake stand is conceivable. The allocation of the brake calipers on the brake stands to brake circuits can finally take place as desired.

As can be gathered further from FIG. 1, the brake calipers 2, 4 and 6, 8 of the system are each supplied by two redundant control circuits 10, 12 and 14, 16, wherein both control circuits 10, 12 and 14, 16 are respectively combined in control units 18 and 20 schematically represented by the dashed lines, which control units contain both the hydraulic components and the respectively associated control electronics (not represented). As can be recognized further, the redundant pumps 22 and 24 (1× active, 1× standby) supply the control circuits 10, 12 and 14, 16 with the required operating pressure; upon safety braking with usually idle pumps, the operating pressure in the control phase is then increased by the pressure reservoirs 23, 25, 27 and 29.

In order to raise the respective brake pads, the active pump (e.g. 22) works at full capacity, as an option temporarily supported by the standby pump (e.g. 24); with the optional support of the pressure reservoirs (23, 25, 27, 29) of the control circuits. When the operating pressure has been reached, the pump flow is reduced to a value, which upholds this operating pressure. At this predominant operating pressure, spring elements (not represented) provided in the brake calipers, which act on the brake pads in the direction of the brake disks, are compressed, so that the brake pads are lifted entirely off the brake disks, forming a minimal gap between the brake shoes and the brake disks. As can be recognized, both control units 18 and 20 are arranged on a hydraulic oil reservoir 26.

As can be gathered likewise from FIG. 1, the control units 18 and 20 can be mutually coupled via a line 28, preferably by a (not represented) ball valve combination, so that e.g. upon a failure of the control unit 18 the system can continue to be operated with the other control unit 20.

Finally, it can also be gathered from FIG. 1 that oil-release valve units 30, 32 are provided on each pair of brake calipers 2, 4 and 6, 8, for the stepwise application of the brake pads on the brake disks, at full braking force or partial braking force, via pressure limiting valves in the lines 34 and 36 to the tank 26, possibly as a backup system.

The oil-release valve units 30, 32 of the system are configured such that in the case of an emergency or safety braking, the oil release valves 30, 32 are opened and the brake pads touch the brake disks. Combinations 38, 40, 42 and 44 of proportional directional control valves, proportional pressure valves and other regulating valves with the same function in each control circuit 10, 12, 14 and 16 regulate the oil flow and thereby the pressure onto the brake calipers 2, 4, 6 and 8, adjusted for the desired deceleration. This is achieved by releasing oil from the control circuits 10, 12, 14 or 16 into the reservoir 26 in order to reduce the pressure in the control circuit, or by associated pressure reservoirs 23, 25, 27 and 29 increasing the pressure in the control circuit 10, 12, 14 or 16 by oil inflow. The respectively one control circuit 10 and 14 of each control unit 18 and 20 serves as primary control circuit, while the respectively other control circuit 12 or 16 remains closed as "hot standby". In the case that one of the primary control circuits 10 or 14 fails, the former is closed, wherein the oil pressure in this control circuit cannot drop below the pressure predetermined by the respective pressure control valve of the combinations 38, 40, 42 and 44. The respective secondary control circuit 12 or 16 in this case assumes the pressure control function, ensuring a closed circle for defined deceleration.

The functioning of the control of the completely closed pressure circulation of the emergency braking in each primary control circuit 10 and 14 and secondary control circuit 12 and 16 is monitored by a speed control system (not represented) on the system, so that it is ensured that the oil pressure in the brake elements 2, 4, 6 and 8 is held such that it follows the adjusted deceleration ramp function.

The invention claimed is:

1. A hydraulic mining hoisting machines or mining winches disk brake system, equipped with at least two separate brake circuits, wherein to each separate brake circuit at least one brake caliper with associated brake pads is allocated, wherein per brake circuit two different redundant, active control circuits are provided.

2. The disk brake system according to claim 1, wherein the respective control circuits of a brake circuit are combined redundantly in a control unit, including the associated control electronics.

3. The disk brake system according to claim 2, wherein the respective control circuits of a brake circuit each have a pressure reservoir.

4. The disk brake system according to claim 2, wherein the control units of the respective brake circuits can be mutually coupled.

5. The disk brake system according to claim 1, wherein for generating pressure two redundant pumps are provided for all brake circuits of the system.

6. The disk brake system according to claim 1, wherein on each brake circuit oil-release valve units are provided additionally.

7. The disk brake system according to claim 6, wherein on each brake circuit pressure limiting valves are provided in connection with the oil-release valve units.

8. A hydraulic mining hoisting machines or mining winches disk brake system comprising:
   a first brake circuit;
   a first brake caliper with associated brake pads allocated to said first brake circuit;
   a first pair of redundant, active control circuits connected to said first brake circuit for controlling said first brake caliper;
   a second brake circuit separate from said first brake circuit;
   a second brake caliper with associated brake pads allocated to said second brake circuit; and
   a second pair of redundant, active control circuits, different from said first pair of redundant active control circuits, connected to said second brake circuit for controlling said second brake caliper.

9. The disk brake system according to claim 8, wherein said first and second pairs of redundant active control circuits each comprise hydraulic components.

10. The disk brake system according to claim 9, further comprising:
    redundant first and second pumps for supplying operating pressure.

11. The disk brake system according to claim 8, further comprising an oil-release valve unit on each of said first and second calipers.

12. A braking apparatus for mining equipment comprising:
    a hydraulic mining hoisting machines or mining winches disk brake system comprising:
       at least two separate brake circuits, each separate break circuit comprising:
          at least one brake caliper with associated brake pads; and
          two different redundant, active control circuits connected to each separate brake circuit for controlling said separate break circuits.

13. The braking apparatus according to claim 12, wherein the respective active control circuits are combined redundantly in a control unit, including associated control electronics.

14. The braking apparatus according to claim 12, wherein each active control circuit further comprises a pressure reservoir.

15. The braking apparatus according to claim 14, further comprising two redundant pumps for generating pressure in said pressure reservoirs.

16. The braking apparatus according to claim 12, wherein the active control units of the respective brake circuits are mutually coupled.

17. The braking apparatus according to claim 12, each separate brake circuit further comprising an oil-release valve unit.

18. The braking apparatus according to claim 17, each brake circuit further comprising a pressure limiting valve in connection with the oil-release valve unit.

\* \* \* \* \*